(12) United States Patent
Iguchi

(10) Patent No.: US 7,978,364 B2
(45) Date of Patent: Jul. 12, 2011

(54) IMAGE PROCESSING APPARATUS AND CONTROL METHOD THEREOF

(75) Inventor: Shunsuke Iguchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 738 days.

(21) Appl. No.: 12/049,469

(22) Filed: Mar. 17, 2008

(65) Prior Publication Data

US 2008/0309980 A1     Dec. 18, 2008

(30) Foreign Application Priority Data

Jun. 18, 2007   (JP) ................................ 2007-160684

(51) Int. Cl.
*G09G 5/00* (2006.01)
*G06K 5/00* (2006.01)

(52) U.S. Cl. ...................................... 358/1.18; 345/620

(58) Field of Classification Search .................. 345/592, 345/589, 604, 618, 586, 606, 663, 689, 679; 348/251, 538, 586; 382/284, 162, 245, 282, 382/311; 715/762; 358/3.28
See application file for complete search history.

(56) References Cited

U.S. PATENT DOCUMENTS

| | | | |
|---|---|---|---|
| 6,621,524 B1 * | 9/2003 | Iijima et al. | 348/584 |
| 7,834,886 B2 * | 11/2010 | Liu | 345/592 |
| 2002/0030634 A1 * | 3/2002 | Noda et al. | 345/5 |
| 2002/0075286 A1 * | 6/2002 | Yonezawa et al. | 345/679 |
| 2002/0118891 A1 * | 8/2002 | Rudd et al. | 382/282 |
| 2006/0140496 A1 * | 6/2006 | Gandolph et al. | 382/245 |
| 2007/0047949 A1 * | 3/2007 | Gluck | 396/427 |
| 2008/0084429 A1 * | 4/2008 | Wissinger | 345/640 |
| 2008/0100642 A1 * | 5/2008 | Betancourt et al. | 345/663 |
| 2008/0215999 A1 * | 9/2008 | Kim et al. | 715/762 |
| 2009/0021528 A1 * | 1/2009 | Liu | 345/606 |
| 2009/0160931 A1 * | 6/2009 | Pockett et al. | 348/42 |
| 2010/0060945 A1 * | 3/2010 | Asano | 358/3.28 |
| 2010/0165414 A1 * | 7/2010 | Kautto et al. | 358/3.28 |

OTHER PUBLICATIONS

PDF Reference Fifth Edition, Version 1.6, Adobe Systems Incorporated , ISBN:0-321-30474-8. pp. 1-1236.
Personalized Print Markup Language, PODi, PPML 2.2, Nov. 2006; internet address:http://www.podi.org. pp. 1-93.

* cited by examiner

Primary Examiner — Jerome Grant, II
(74) Attorney, Agent, or Firm — Rossi, Kimms & McDowell LLP

(57) ABSTRACT

In order to provide a technique which can shorten the processing time in large-scale variable print processing, an image processing apparatus includes: an input unit adapted to input a rendering job which includes a single fixed object common to respective pages, and a plurality of variable objects which are independent for respective pages; a designation unit adapted to designate an inclusion region that includes rendering regions respectively for the plurality of rendering objects; a transparent processing unit adapted to generate transparent processed images by executing transparent processing in correspondence with the plurality of transparency attributes for a region of the fixed object that overlaps the inclusion region; a clipping image generation unit adapted to generate a clipping image by clipping a region from the transparent processed image; and a generation unit adapted to generate rendering data by blending the clipping image and the fixed object.

14 Claims, 14 Drawing Sheets

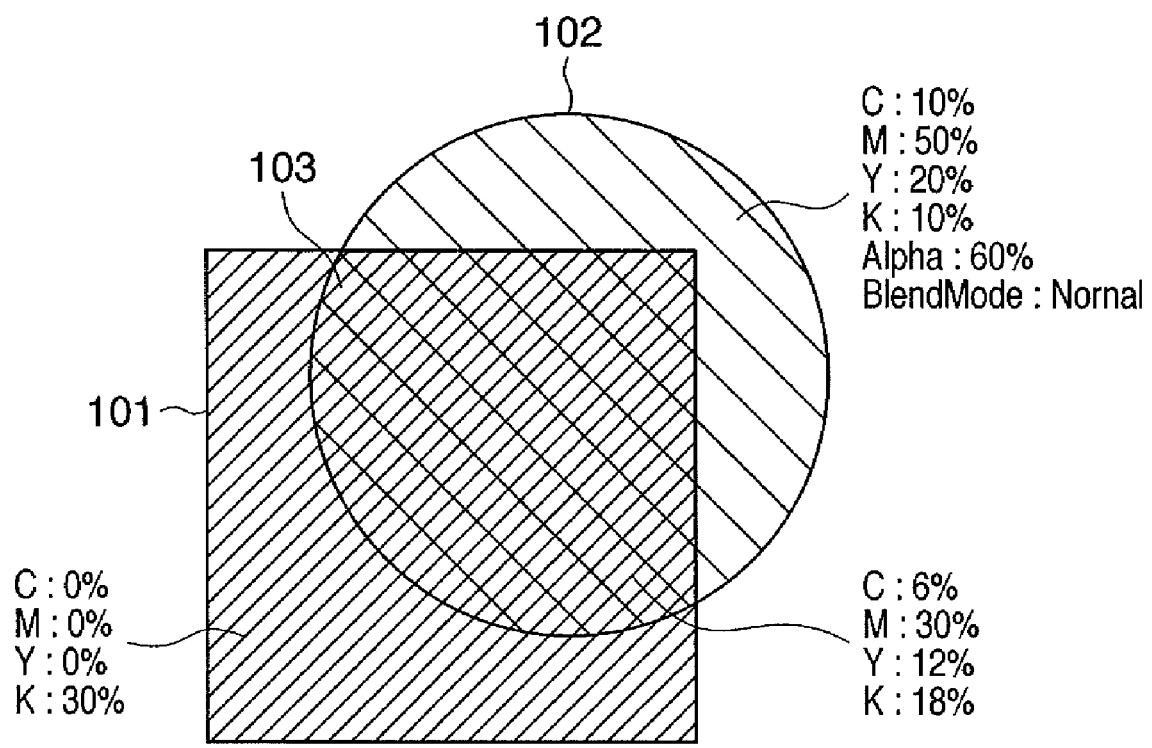
F I G. 1

1301

IMAGE PROCESSING APPARATUS AND CONTROL METHOD THEREOF

BACKGROUND OF THE INVENTION

1. Field of the Invention

The present invention relates to an image processing technique for generating composite image data based on variable data and fixed data.

2. Description of the Related Art

In recent years, variable print processing that applies blend print processes of a plurality of variable data to fixed background image data is used. Particularly, instances that implement variable print processing having an appealing visual effect to customers by applying a transparent effect are increasing.

There are some page description languages (PDL) which can provide a transparent effect to objects. For example, with the PDF format of Adobe Systems Incorporated (see PDF Reference, 5th Edition, Version 1.6, Adobe Systems Incorporated, ISBN: 0-321-30474-8), background and transparent objects can undergo transparent effect processing and can be displayed on a display or can be printed. Also, various page description languages for efficiently implementing printing using variable data have been developed. For example, PPML (Personalized Print Markup Language) defined by PODi (Print On Demand Initiative) is available (see PPML Functional Specification, Version 2.1 (http://www.podi.org/)). With these page description languages, a non-variable region that has undergone rendering processing is cached on a storage device. Then, a variable region that has undergone the rendering processing is blended to the readout cached object, thus controlling to attain high-speed processing while avoiding the non-variable region from repetitively undergoing the rendering processing.

However, in general, enormous floating-point calculations are required to execute the transparent processing. For this reason, in variable print processing including transparent processing, the processing time increases greatly. Particularly, in commercial print processes required to attain high-speed print processes despite a huge number of records, a desired print speed cannot often be attained. In particular, in variable print processing in which a background object is a complicated image like a photo image, and foreground transparent objects are defined as variable data, the transparent processing needs to be applied for each pixel of the background image, and the print speed drop is serious.

SUMMARY OF THE INVENTION

The present invention has been made in consideration of the aforementioned problems, and has as its object to provide a technique that can shorten the processing time in large-scale variable print processing.

According to one aspect of the present invention, an image processing apparatus comprises: an input unit adapted to input a rendering job which includes a single fixed object common to respective pages, and a plurality of variable objects which are allocated in front of the fixed object and are independent for respective pages; a designation unit adapted to designate an inclusion region that includes rendering regions respectively for the plurality of rendering objects; a transparent processing unit adapted to generate transparent processed images corresponding to a plurality of transparency attributes by executing transparent processing in correspondence with the plurality of transparency attributes for a region of the fixed object that overlaps the inclusion region; for each page included in the rendering job, a clipping image generation unit adapted to generate a clipping image by clipping a region corresponding to a shape of the variable object from the transparent processed image corresponding to the same transparency attribute as the transparency attribute designated for the variable object; and a generation unit adapted to generate rendering data by blending the clipping image and the fixed object.

According to another aspect of the present invention, an image processing apparatus comprises: an input unit adapted to input a rendering job which includes a single fixed object common to respective pages, and a plurality of variable objects which are allocated in front of the fixed object and are independent for respective pages; a designation unit adapted to designate an inclusion region that includes rendering regions respectively for the plurality of rendering objects; a storage control unit adapted to execute transmission processing to the fixed object and the inclusion region for a region of the fixed object that overlaps the inclusion region, and to store a generated transparent processed image in a storage unit; for each page included in the rendering job, a clipping image generation unit adapted to generate a clipping image by clipping a region corresponding to a shape of the variable object from the image which is stored in the storage unit and has undergone the transparent processing; and a generation unit adapted to generate rendering data by blending the clipping image and the fixed object.

According to still another aspect of the present invention, a method of controlling an image processing apparatus, comprises: an input step of inputting a rendering job which includes a single fixed object common to respective pages, and a plurality of variable objects which are allocated in front of the fixed object and are independent for respective pages; a designation step of designating an inclusion region that includes rendering regions respectively for the plurality of rendering objects; a transparent processing step of generating transparent processed images corresponding to a plurality of transparency attributes by executing transparent processing in correspondence with the plurality of transparency attributes for a region of the fixed object that overlaps the inclusion region; for each page included in the rendering job, a clipping image generation step of generating a clipping image by clipping a region corresponding to a shape of the variable object from the transparent processed image corresponding to the same transparency attribute as the transparency attribute designated for the variable object; and a generation step of generating rendering data by blending the clipping image and the fixed object.

According to yet another aspect of the present invention, a method of controlling an image processing apparatus, comprises: an input step of inputting a rendering job which includes a single fixed object common to respective pages, and a plurality of variable objects which are allocated in front of the fixed object and are independent for respective pages; a designation step of designating an inclusion region that includes rendering regions respectively for the plurality of rendering objects; a storage control step of executing transmission processing to the fixed object and the inclusion region for a region of the fixed object that overlaps the inclusion region, and storing a generated transparent processed image in a storage unit; for each page included in the rendering job, a clipping image generation step of generating a clipping image by clipping a region corresponding to a shape of the variable object from the image which is stored in the storage unit and has undergone the transparent processing; and a generation step of generating rendering data by blending the clipping image and the fixed object.

According to the present invention, the technique that can shorten the processing time in large-scale variable print processing can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view for explaining the processing for applying a transparent effect using an example;

DESCRIPTION OF THE EMBODIMENTS

Figure 2:
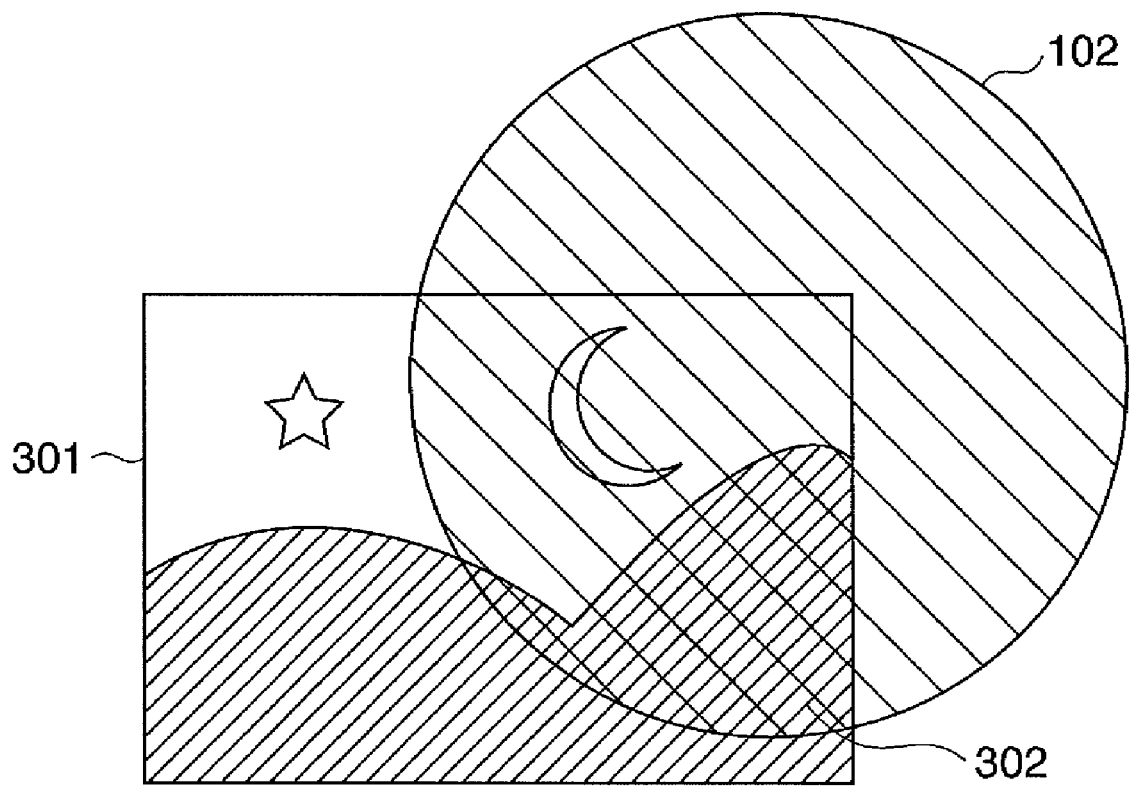
FIG. 2 is a view for explaining the processing for applying the transparent effect using another example.

Preferred embodiments of the present invention will be described in detail hereinafter with reference to the accompanying drawings. Note that the following embodiments are merely examples, and do not limit the scope of the present invention.

First Embodiment

The first embodiment of an image processing apparatus according to the present invention will be described below taking a printing apparatus as an example.

<Overview of Transparent Processing>

FIG. 1 is a view for explaining the processing for applying a transparent effect using an example.

For the sake of simplicity, a case will be described wherein a background object 101 and a transparent object 102 which is set with a transparency attribute and is allocated as a foreground are included. An image is configured by the background object, the transparent object, and their overlap portion 103. The colors of these objects are defined by a CMYK color space. For example, the background object has a density of K=30% alone. The transparent object 102 is a dark pink object having densities of C=10%, M=50%, Y=20%, and K=10%.

Let Cr be a resultant color of a certain pixel in the overlap portion 103. Then, the transparent effect is processed by:

$$Cr=(1-\alpha s/\alpha r) \times Cb + \alpha s/\alpha r \times \{(1-\alpha b) \times Cs + \alpha b \times B(Cb, Cs)\}$$

where
Cb: the color of the background object
Cs: the color of the transparent object (as a foreground)
$\alpha r$: the transparency (alpha value) of the resultant image
$\alpha b$: the transparency of the background object
$\alpha s$: the transparency of the transparent object
B(Cb, Cs): a blend function Of these parameters, the blend function is used to define the visual effect of the transparent portion. For the blend function, a normal mode, multiply mode, screen mode, overlay mode, and the like are defined. In the normal mode, B(Cb, Cs)=Cs is defined. In other modes, arithmetic computations are made between Cb and Cs.

Assume that the blend function is the normal mode, and $\alpha r=100\%$ (opaque). Then, the aforementioned equation can be simplified as:

$$Cr=(1-\alpha s) \times Cb + \alpha s \times Cs$$

For example, when the transparency of the transparent object 102 is set to be 60% ($\alpha s=0.6$), and is applied to respective C, M, Y, and K channels, the overlap portion 103 is calculated as:

$$C=0.4 \times 0\% + 0.6 \times 10\% = 6\%$$

$$M=0.4 \times 0\% + 0.6 \times 50\% = 30\%$$

$$Y=0.4 \times 0\% + 0.6 \times 20\% = 12\%$$

$$K=0.4 \times 30\% + 0.6 \times 10\% = 18\%$$

Note that the transparent processing is applied to white as a background even in a portion of the transparent object 102 which does not overlap the background object. Hence, respective colors have densities 60% of the original densities of the respective channels, as given by:

$$C=0.6 \times 10\% = 6\%$$

$$M=0.6 \times 50\% = 30\%$$

$$Y=0.6 \times 20\% = 12\%$$

$$K=0.6 \times 10\% = 6\%$$

In this manner, since the transparent processing requires floating-point calculations for both the background color and the colors of the object to be blended, it becomes time-consuming processing relative to other processes in the page description language.

FIG. 2 is a view for explaining the processing for applying the transparent effect using another example. More specifically, FIG. 2 shows a case in which the transparent object 102 has a transparency with respect to a background object 301 as a photo image.

In this example, since the background object 301 is a photo image, it generally has different pixel values pixel by pixel. For this reason, in an overlap portion 302 with the transparent object 102, colors are different for respective pixels. Therefore, the aforementioned transparent processing needs to be executed for each pixel. That is, the computation volume spent for the transparent processing becomes huge compared to FIG. 1. Particularly, since the commercial print processing popularly uses high-resolution images (e.g., 1200 dpi or higher), a huge computation volume is required.

<Apparatus Arrangement>

Figure 3:
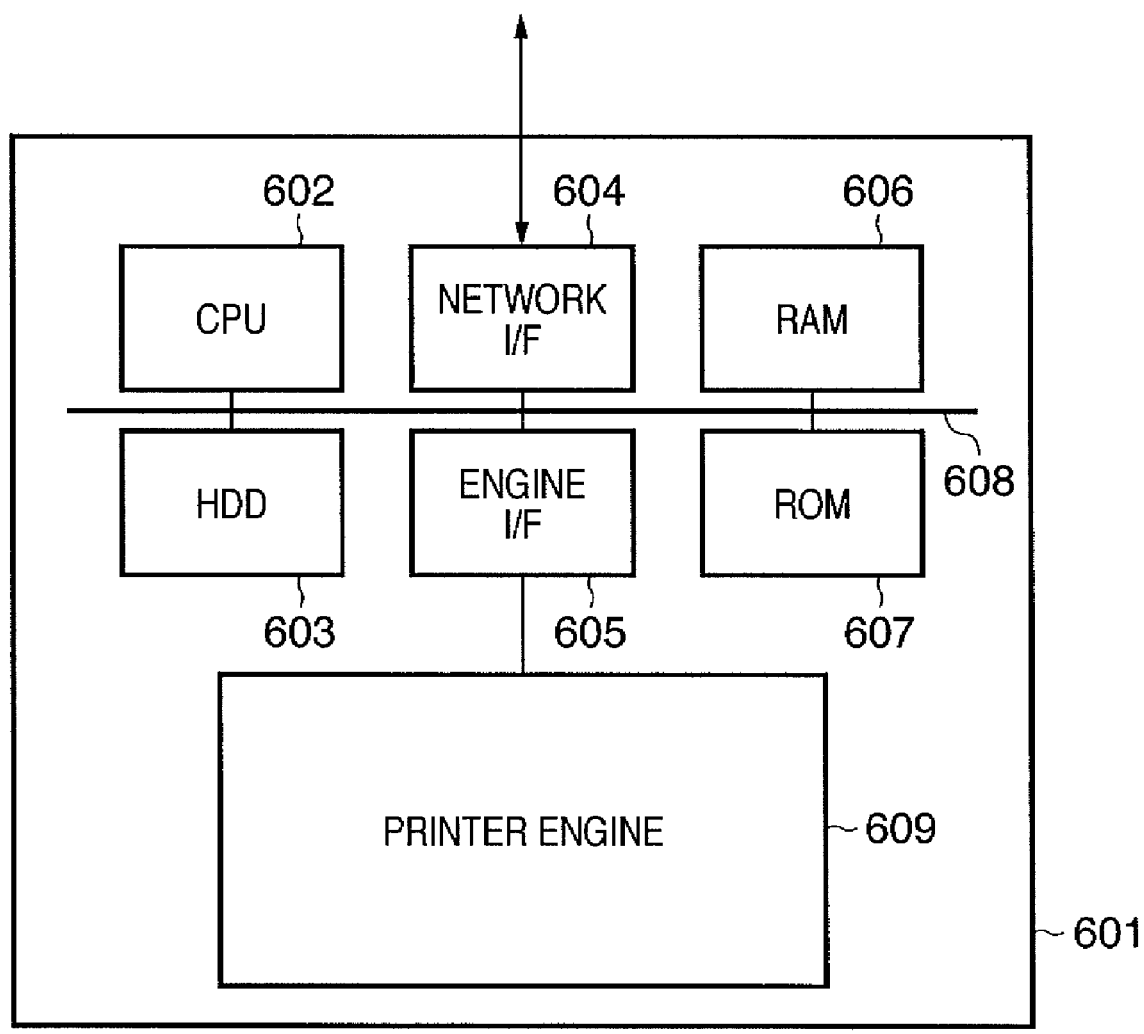
FIG. 3 is a block diagram showing the internal arrangement of a printing apparatus 601 according to the first embodiment.

FIG. 3 is a block diagram showing the internal arrangement of a printing apparatus 601 according to the first embodiment.

A central processing unit (CPU) 602 performs control and computations of respective unit inside the apparatus and execution of programs stored in a storage device via a system bus 608. A random-access memory (RAM) 606 is used as a temporary storage area and work memory when the printing apparatus operates. A hard disk drive (HDD) 603 is a large-capacity storage device, and stores various control programs to be executed by the CPU 602. Also, the HDD 603 is used as a temporary storage area of data to be processed. A boot ROM 607 is a storage device that stores a boot processing program of the printing apparatus.

A network interface (I/F) 604 is a functional unit which communicates with other apparatuses such as a host computer and the like via an external network. An engine interface (I/F) 605 makes communications with and control of a printer engine 609. The printer engine 609 is a device for forming an image on a physical sheet surface using an electrophotography technique or ink-jet image forming technique.

<Basic Operation Sequence of Variable Print>

Figure 4A:
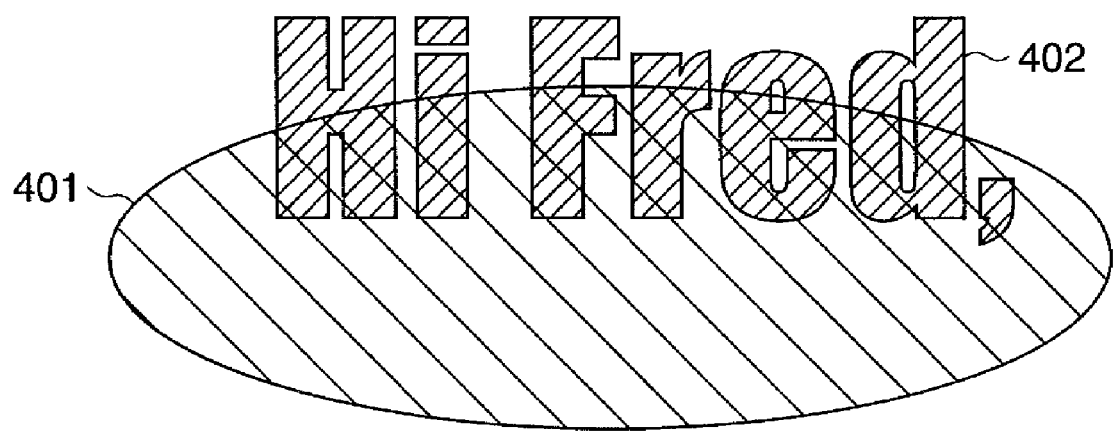
FIGS. 4A and 4B show examples of a variable print processing using the transparent effect.
Figure 4B:
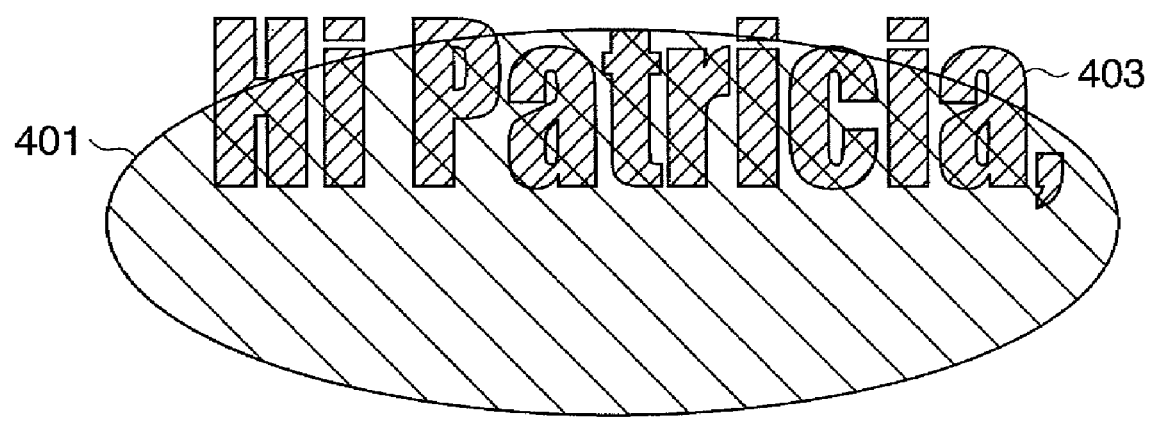

FIGS. 4A and 4B show examples of the variable print processing using the transparent effect.

In FIG. 4A, a variable object 402 is blended to a background object 401 using the transparent effect. In FIG. 4B, a variable object 403 is blended to the background object 401 using the transparent effect. That is, the background object 401 is common to both the examples, and the variable objects 402 and 403 are those which have different shapes (the object 402 includes a character string "Hi Fred," and the object 403 includes a character string "Hi Patricia,").

Figure 5:
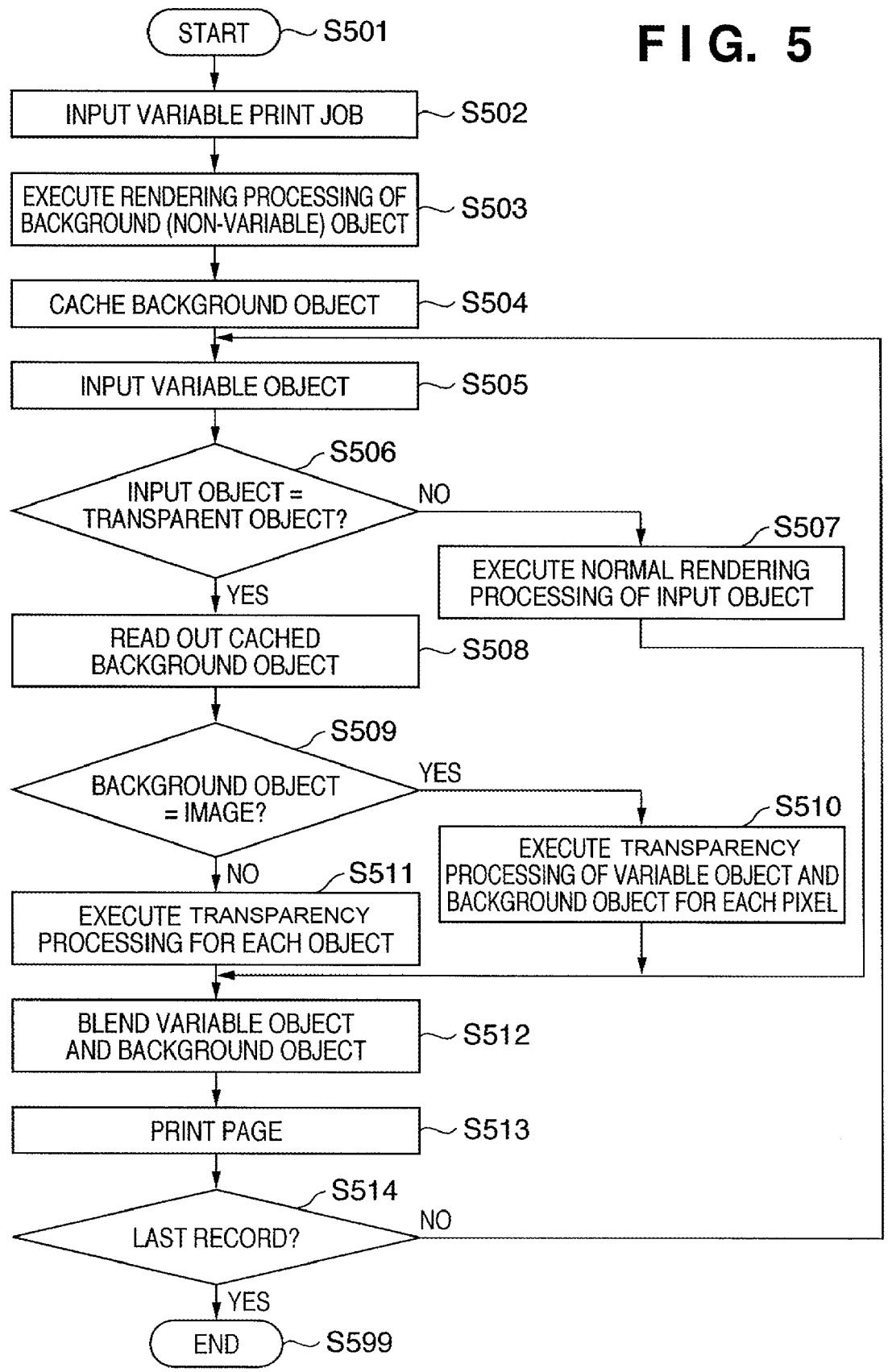
FIG. 5 is a flowchart showing the basic operation of the variable print processing.

FIG. 5 is a flowchart showing the basic operation of the variable print processing. This processing is the same as the conventional processing. In the following description, the "number of records" means the number of variable data records in the variable print processing. Note that respective steps of the following operation are implemented when the CPU 602 executes a control program.

In step S501, the CPU 602 starts the variable print sequence in the printing apparatus 601.

In step S502, the printing apparatus 601 receives a variable print job (rendering job). More specifically, the printing apparatus 601 accepts an input from a host computer via the network interface (I/F) 604. Note that the variable print job includes rendering instructions of the single background object 401 and the plurality of variable objects 402 and 403. That is, the job includes a single fixed object common to respective pages, and a plurality of variable objects which are allocated in front of the fixed object and are independent for respective pages.

In step S503, the CPU 602 renders the background object 401 designated in the variable print job received in step S502.

In step S504, the CPU 602 temporarily stores (caches) the background object 401 in the RAM 606 or HDD 603.

In step S505, the CPU 602 inputs the variable object designated in the variable print job received in step S502.

The CPU 602 checks in step S506 if the variable object input in step S505 is a transparent object (object designated with the transparent processing). If the CPU 602 determines that the variable object is not a transparent object, the process advances to step S507; otherwise, the process advances to step S508.

In step S507, the CPU 602 executes normal rendering of the variable object without applying any transparent processing.

In step S508, the CPU 602 reads out the background object cached in step S504 from the RAM 606 or HDD 603.

The CPU 602 checks in step S509 if the readout background object 401 is a photo image. Note that a photo image indicates the background object 401, the entire surface of which does not have a single color attribute. If the CPU 602 determines that the background object is not a photo image, the process advances to step S511; otherwise, the process advances to step S510.

In step S510, the CPU 602 applies the transparent processing for the entire region of the variable object for each pixel to the variable and background objects. On the other hand, in step S511 the CPU 602 applies the transparent processing for each object to the variable and background objects.

In step S512, the CPU 602 executes the blend processing of the result processed in one of steps S507, S510, and S511, and the background object.

In step S513, the CPU 602 prints a page image generated in step S512.

The CPU 602 checks in step S514 if the processes are complete for all records. If the previously processed record is the last record, the process advances to step S599 to end the variable print processing. If the CPU 602 determines that the previously processed record is not the last record, the process returns to step S505 to execute the processes for a new variable object.

<Expanded Operation Sequence of Variable Print>

However, in the processing described using FIG. 5, the processing load becomes heavier with an increasing number of records to which the transparent processing is to be executed. As a result, the processing time is prolonged. More specifically, step S510 or S511 needs to be executed for each record, and these processes makes the processing load heavier.

In the variable print job, variable objects of all records are normally designated as those which fall within a predetermined region in each page.

Figure 6A:
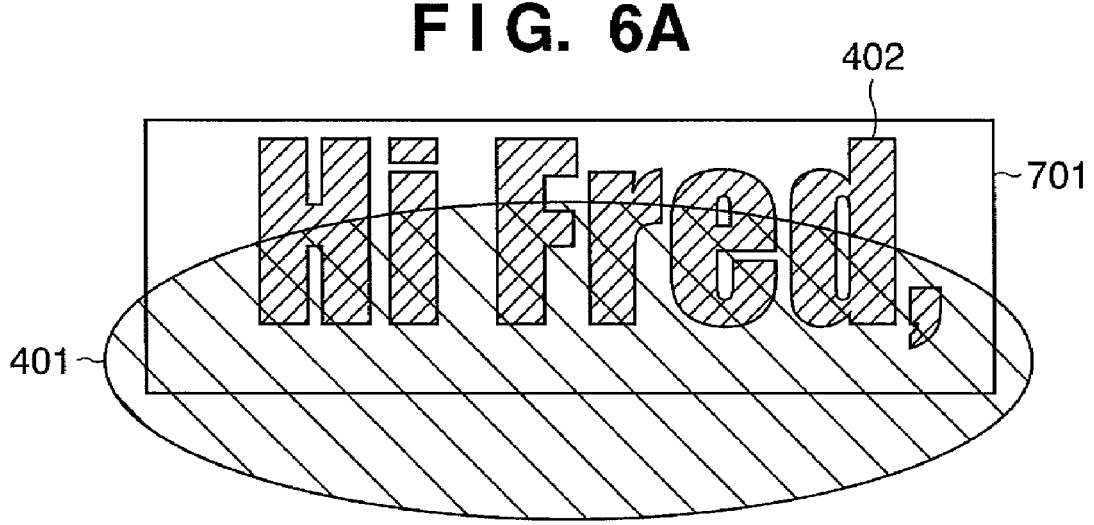
FIGS. 6A to 6C are views showing examples of a variable print job according to the present invention.
Figure 6B:
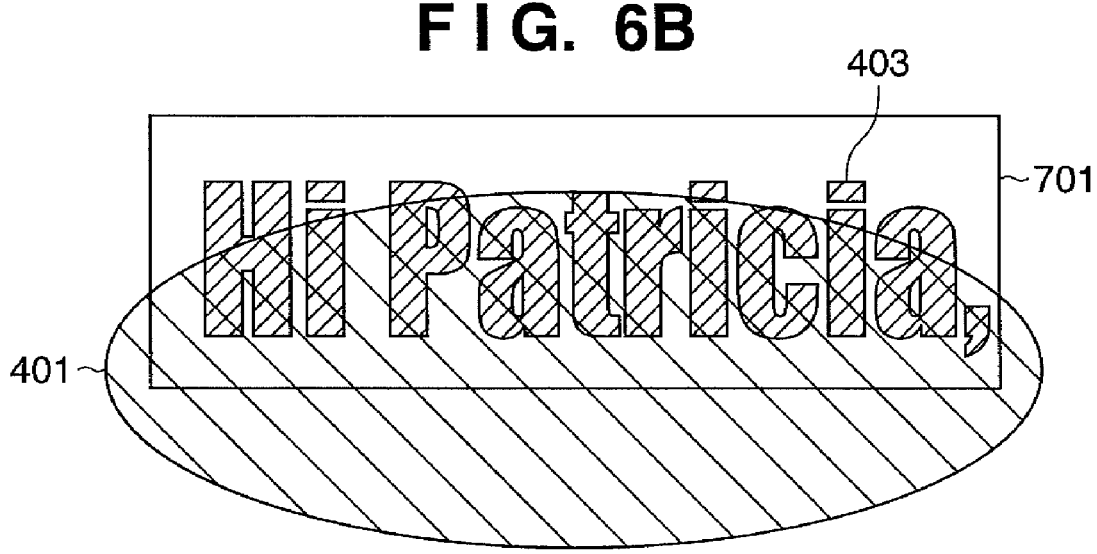

FIGS. 6A and 6B show examples of a variable print job according to the first embodiment. In a variable print job of the first embodiment, each of the variable objects 402 and 402 is allocated inside a rectangular region 701, as shown in FIGS. 6A and 6B. That is, as can be seen from FIGS. 6A and 6B, a region to which the transparent processing is applied within each page is the rectangular region 701. Note that the region 701 is assumed to be a rectangular region in the following description for the sake of simplicity. However, the region 701 may have an arbitrary shape.

Figure 7:
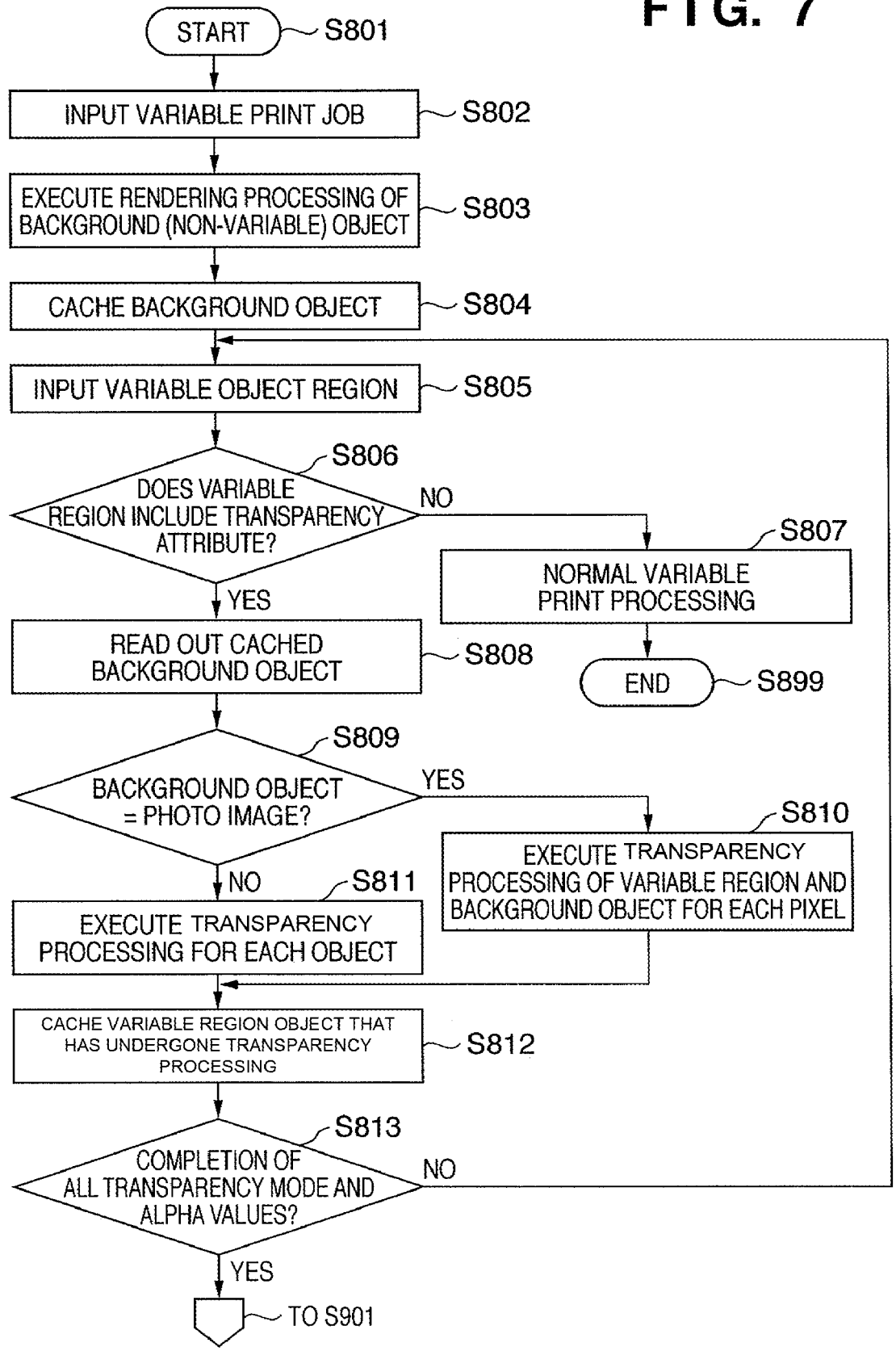
FIG. 7 is a flowchart showing the processing (common processing) of a variable print job according to the first embodiment.
Figure 8:
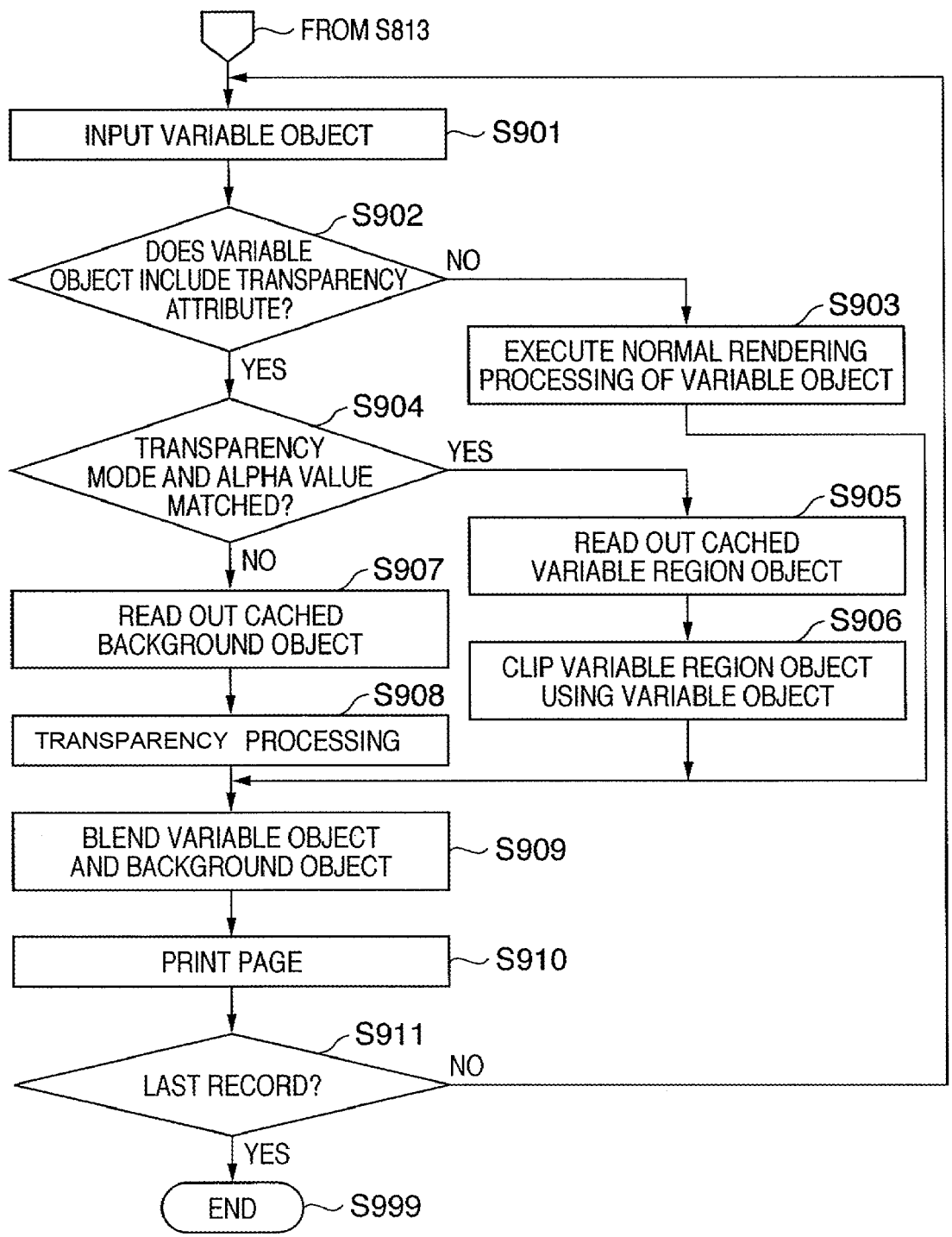
FIG. 8 is a flowchart showing the processing (individual processing) of a variable print job according to the first embodiment.

FIGS. 7 and 8 are flowcharts of the processing of a variable print job in the first embodiment. Particularly, FIG. 7 shows the processing to be executed common to respective variable records. On the other hand, FIG. 8 shows the processing to be executed individually for each variable record. Note that respective steps of the following operation are implemented when the CPU 602 executes a control program.

In step S801, the CPU 602 starts the variable print sequence in the printing apparatus 601.

In step S802, the printing apparatus 601 receives a variable print job (rendering job). More specifically, the printing apparatus 601 accepts an input from a host computer via the network interface (I/F) 604. Note that the variable print job includes rendering instructions of the single background object 401 and the plurality of variable objects 402 and 403.

In step S803, the CPU 602 renders the background object 401 designated in the variable print job received in step S802.

In step S804, the CPU 602 caches the background object 401 in the RAM 606 or HDD 603. In step S804, the CPU 602 also caches coordinate information of background object 401 in the RAM 606 or HDD 603.

In step S805, the CPU 602 inputs (sets) the region 701 for variable objects, which is designated in the variable print job received in step S502. That is, the CPU 602 designates an inclusion region that includes rendering regions for a plurality of variable objects. The region 701 designated in step S805 could include both of the background object 401 and the plurality of variable objects.

The CPU 602 checks in step S806 if the input region 701 includes a transparent region. If the CPU 602 determines that the input region 701 does not include any transparent regions, it executes the normal variable print processing described above with reference to FIG. 5. On the other hand, if the CPU 602 determines that the region 701 includes a transparent region, the process advances to step S808.

In step S808, the CPU 602 reads out the background object cached in step S804 from the RAM 606 or HDD 603.

The CPU 602 checks in step S809 if the readout background object 401 is a photo image. Note that a photo image indicates the background object 401, the entire surface of which does not have a single color attribute. If the CPU 602 determines that the background object is not a photo image, the process advances to step S811; otherwise, the process advances to step S810.

Figure 6C:
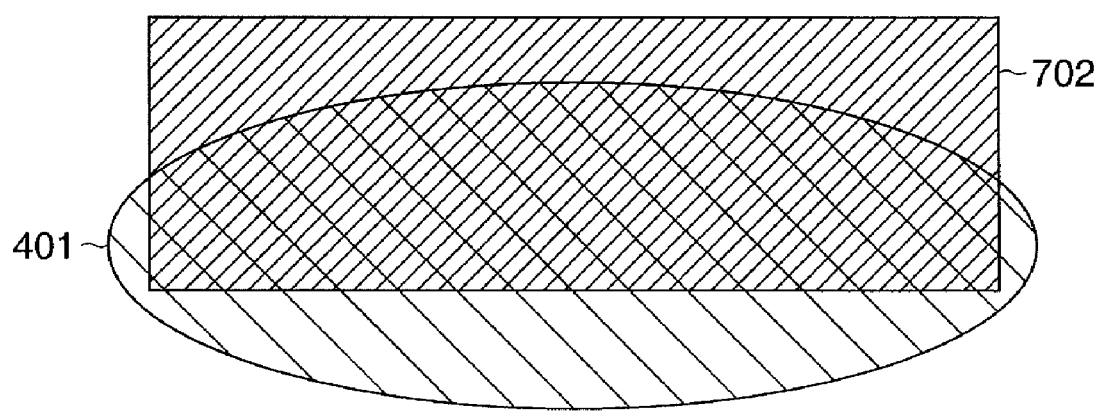

In step S810, the CPU 602 applies the transparent processing for the entire region of the variable object for each pixel to the variable and background objects. On the other hand, in step S811 the CPU 602 applies the transparent processing for each object to the variable and background objects. As described above, the processing speed of step S810 that requires the processing for each pixel becomes lower than that of step S811. FIG. 6C shows a variable region object 702 which has undergone the transparent processing.

In step S812, the CPU 602 controls to cache the variable region object 702 that has undergone the transparent processing in the HDD 603 as a storage unit. In step S812, the CPU 602 also caches coordinate information of variable region object 702 in the HDD 603.

The CPU 602 checks in step S813 if the processes in steps S805 to S812 are executed for all transparency modes and alpha values included in the received variable print job. After the CPU 602 applies transparent processing to the variable object region for all the transparency modes and alpha values, and caches the processed results, the process advances to step S901. That is, the CPU 602 corresponds to a transparent processing unit which generates transparent processed images by executing the transparent processing to a region of the fixed object which overlap the inclusion region (region 701) in association with a plurality of transparency attributes.

In step S901, the CPU 602 inputs a variable object.

The CPU 602 checks in step S902 if the variable object includes a transparency attribute. If the CPU 602 determines that the variable object does not include any transparency attribute, the process advances to step S903; otherwise, the process advances to step S904.

In step S903, the CPU 602 executes a normal rendering processing of the variable object.

The CPU 602 checks in step S904 if the transparency mode and alpha value match those of the object cached in step S812. If they do not match, the process advances to step S907; otherwise, the process advances to step S905. However, since all variable regions included in the received variable print data are cached in step S812, the process advances to step S907 only for an error.

In step S907, the CPU 602 extracts the cached background object. In step S908, the CPU 602 applies the normal transparent processing.

In step S905, the CPU 602 reads but the variable region object 702 that has undergone the corresponding transparent processing. In step S905, the CPU 602 also reads out the coordinate information of an object shape for the variable object. In step S906, the CPU 602 applies clipping processing to the variable region object 702 that has undergone the transparent processing using an object shape for the variable object. That is, the CPU 602 corresponds to a clipping image generation unit which generates a clipping image by clipping a region with the shape of the variable object from the transparent processed image corresponding to the same transparency attribute as that designated for the variable object. In clipping processing, the CPU 602 also generates coordinate information of the clipping image.

Figure 9A:
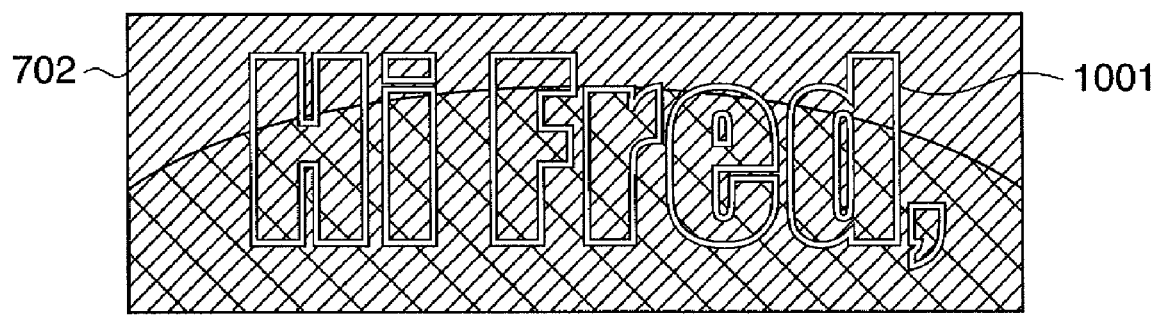
FIGS. 9A and 9B are views for explaining clipping processing and blend processing using a variable object according to the first embodiment.
Figure 9B:
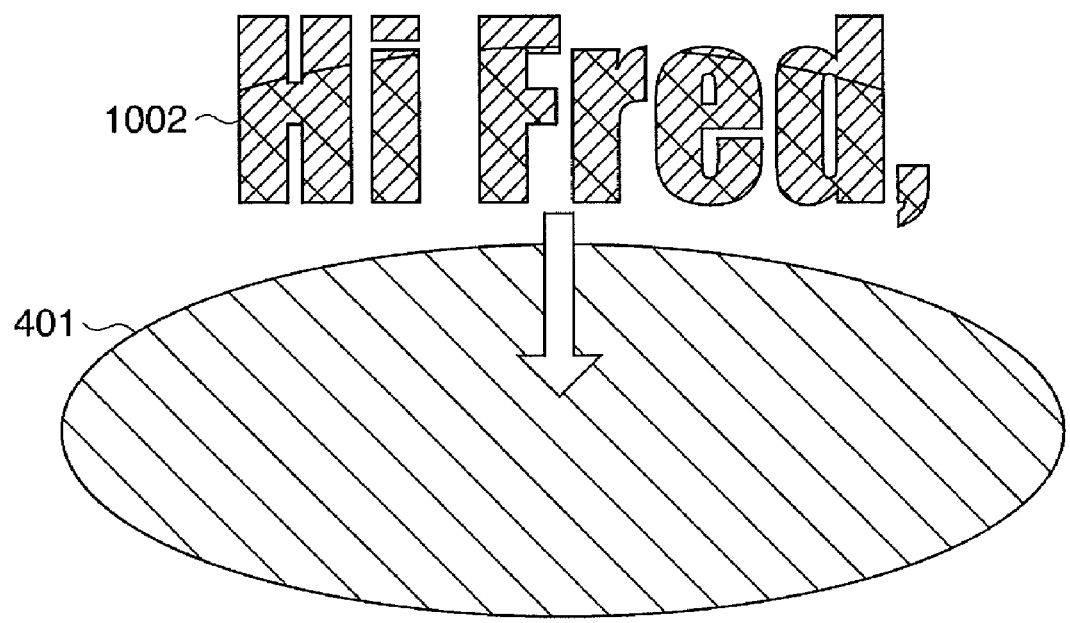

FIGS. 9A and 9B are views for explaining the clipping processing using the variable object according to the first embodiment. More specifically, a variable object shape 1001 is allocated at a designated position of the cached variable region object 702 that has undergone the transparent processing. Then, the variable region object 702 that has undergone the transparent processing is clipped using the outline of the variable object shape 1001, thus generating a clipped variable object 1002. That is, the CPU 602 corresponds to a generation unit which generates rendering data by blending the clipping image and fixed object.

In step S909, the CPU 602 blends the clipped image and the background object 401 using the coordinate information of the clipping image and the coordinate information of the background object 401. By this blending, the clipped image is blended into the correct position in the background object 401. Also, in the blending processing, the CPU 602 substitutes an image of the blending area of the background object 401 for the clipped image. By this substitution, the color of the clipped image and color of the background object 401 are prevented from being blended.

FIG. 9B is a view for explaining the processing for blending the clipped object and background object according to the first embodiment.

In step S910, the CPU 602 prints a page image generated in step S909.

The CPU 602 checks in step S911 if the processes are complete for all records. If the previously processed record is the last record, the process advances to step S999 to end the variable print processing. If the CPU 602 determines that the previously processed record is not the last record, the process returns to step S901 to execute the processes for a new variable object.

That is, the CPU 602 applies the transparent processing to the region 701 in advance in step S812, and then executes the clipping processing and blend processing for the shape of each variable object. With this processing, the transparent processing computation itself can be ended by the single processing. That is, a transparent computation need not be repeated for identical coordinates of different variable objects. For this reason, the variable print results can be obtained at high speed. Particularly, since the number of computations for identical coordinates increases with increasing number of records, the aforementioned processing becomes more effective with increasing number of records.

As described above, according to the printing apparatus of the first embodiment, the processing time in large-scale variable print processing can be shortened.

Second Embodiment

The aforementioned first embodiment is premised on that respective variable objects are designated in advance to fall within an identical region (the region 701). However, that region need not be designated in advance.

The second embodiment will explain a case in which a region within which respective variable objects fall is not designated in advance.

Figure 10:
FIG. 10 is a view for explaining the coordinate allocation of a variable object within a page according to the second embodiment.

FIG. 10 is a view for explaining the coordinate allocation of a variable object within a page according to the second embodiment. FIG. 10 uses a coordinate system having the lower left position of a page as an origin. Then, a minimum value (Xmin) and maximum value (Xmax) of the X-coordinates of each variable object, and a minimum value (Ymin) and maximum value (Ymax) of the Y-coordinates of it can be expressed, as shown in FIG. 10. As can be seen from FIG. 10, by calculating Xmin and Ymin which become minimum and Xmax and Ymax which become maximum for all variable objects, a region corresponding to the region 701 can be derived. Hence, the method of determining such region will be described in detail below.

Figure 11:
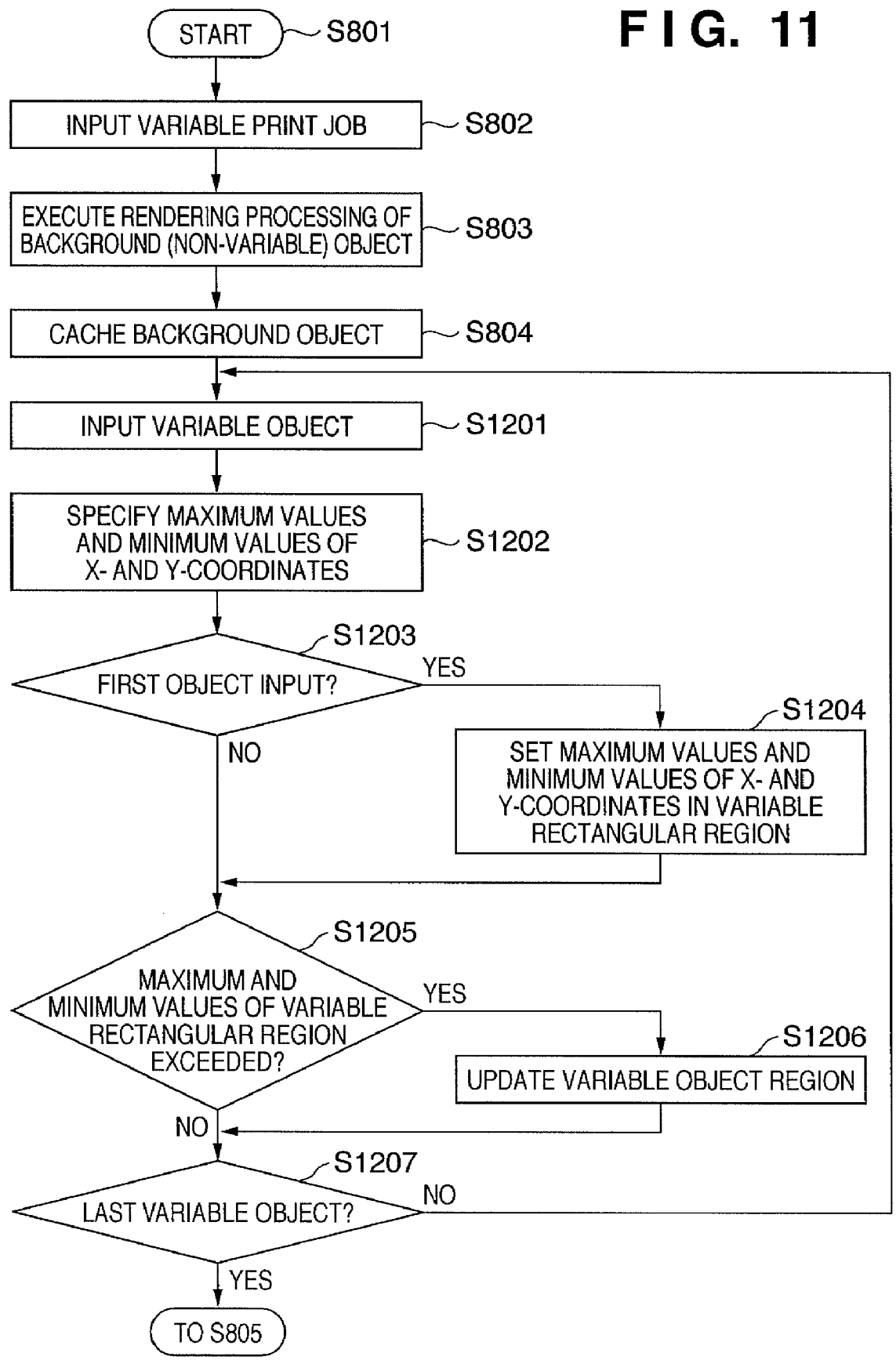
FIG. 11 is a flowchart showing the processing for determining a region within which respective variable objects fall according to the second embodiment.

FIG. 11 is a flowchart showing the processing for determining a region within which respective variable object fall according to the second embodiment. More specifically, the CPU 602 executes this determination processing between steps S804 and S804 described with reference to FIG. 7.

In step S1201, the CPU 602 accepts an input variable object.

In step S1202, the CPU 602 specifies the minimum and maximum values (Xmin, Xmax) of the X-coordinates and those (Ymin, Ymax) of the Y-coordinates of the variable object input in step S1201.

The CPU 602 checks in step S1203 if the variable object as the current object to be processed is the first input. If that object is the first input, the process advances to step S1204; otherwise (second or subsequent input), the process advances to step S1205.

In step S1204, the CPU 602 sets the minimum and maximum values (Xmin, Xmax) of the X-coordinates and those (Ymin, Ymax) of the Y-coordinates of the variable object as the current object to be processed in the X- and Y-coordinates of a variable rectangular region, and saves them in the RAM 606. That is, since there is no object to be compared in the first processing, the minimum and maximum values of the object are used as initial values of the variable rectangular region. Note that the variable rectangular region means a temporary rectangular region used in this flowchart so as to determine the coordinates of a rectangular region to be derived.

In step S1205, the CPU 602 compares the maximum and minimum values of the X- and Y-coordinates of the variable object as the current object to be processed with those of the X- and Y-coordinates of the variable rectangular region saved in the RAM 606.

In step S1206, the CPU 602 updates the value saved in the RAM 606 in association with a maximum or minimum value that exceeds (is smaller than in the case of a minimum value) the current maximum or minimum value of the X- and Y-coordinates of the variable rectangular region.

The CPU 602 checks in step S1207 if the variable object as the current object to be processed is the last object. If the current variable object is not the last object, the process returns to step S1201. In this way, the maximum and minimum values of the X- and Y-coordinates for all variable objects can be calculated.

As described above, according to the printing apparatus of the second embodiment, even when a region within which respective variable objects fall is not designated in advance, the processing time in large-scale variable print processing can be shortened.

Third Embodiment

In the descriptions of the first and second embodiments, the region including the coordinates of respective variable objects is a rectangular region. However, when such a region is designated as a rectangular region, it generally includes coordinates which are not used after all. That is, by making the transparent processing computation for a region which is not used, a wasteful processing time may be generated.

In the third embodiment, a method of deriving a more suited target region of the transparent processing computation will be described.

Figure 12:
FIG. 12 shows an example of a state in which a plurality of variable objects overlap each other.

FIG. 12 shows an example of a state in which a plurality of variable objects overlap each other in the third embodiment. More specifically, an object 1301 is a region derived by calculating the logical sum of the respective regions corresponding to the variable objects 402 and 403. That is, by calculating the logical sum (OR) of regions corresponding to all variable objects, a region indicating the coordinates to which the transparent processing is to be applied can be derived. Hence, the method of determining such region will be described in detail below.

Figure 13:
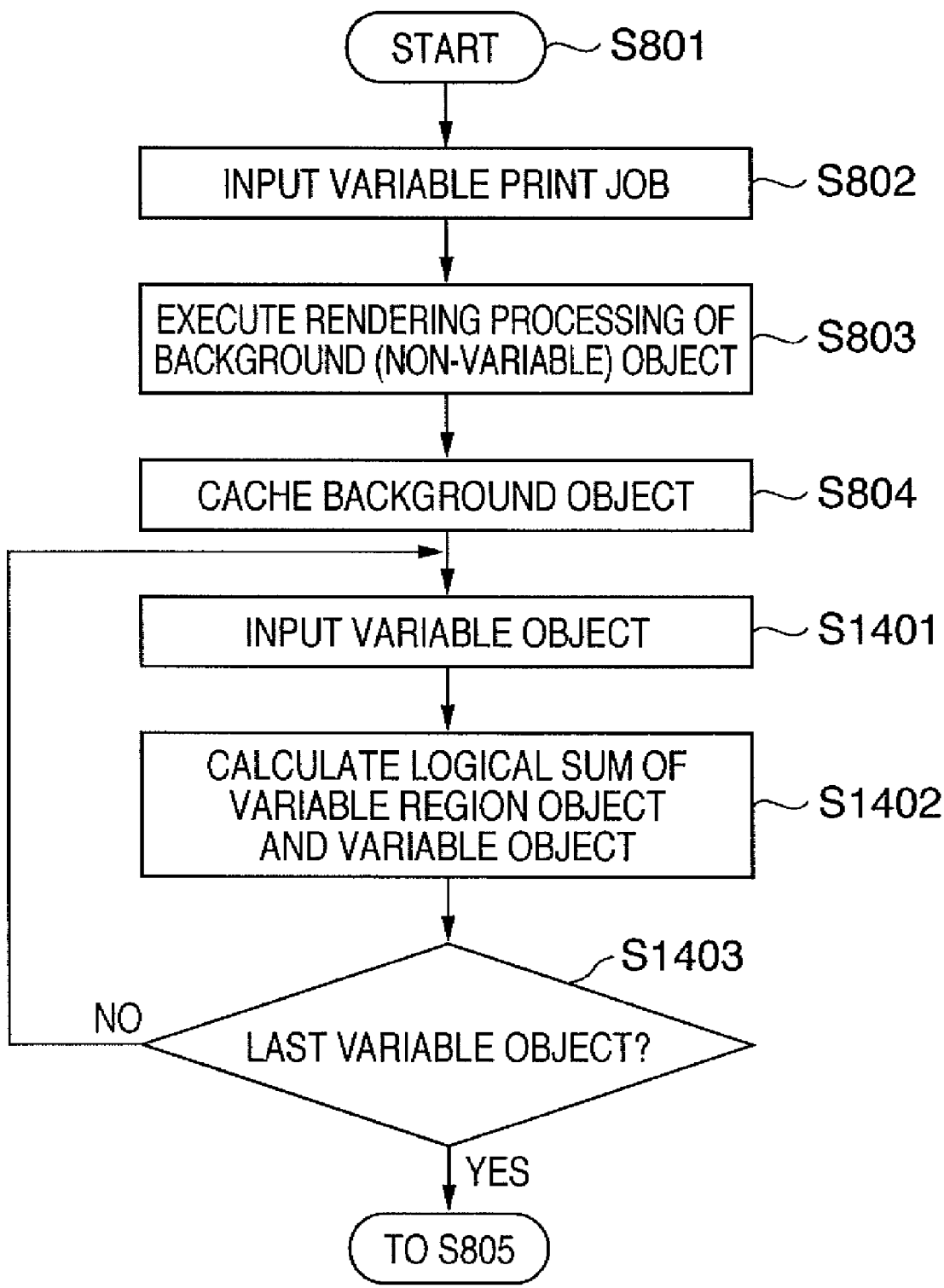
FIG. 13 is a flowchart showing the processing for determining a region indicating coordinates that are to undergo transparent processing according to the third embodiment.

FIG. 13 is a flowchart showing the processing for determining a region indicating the coordinates to which the transparent processing is to be applied in the third embodiment. More specifically, the CPU 602 executes this determination processing between steps S804 and S804 described with reference to FIG. 7.

In step S1401, the CPU 602 accepts an input variable object.

In step S1402, the CPU 602 computes the OR of the region of the variable object input in step S1401 to update a variable region saved in the RAM 606. Note that the CPU 602 derives the region itself of the variable object as a variable region in the first processing, and saves it in the RAM 606. Note that the variable region means a temporary region used in this flowchart so as to determine a region to be derived.

The CPU 602 checks in step S1403 if the variable object as the current object to be processed is the last object. If the current variable object is not the last object, the process returns to step S1401. In this way, an OR region of the regions of all variable objects can be computed.

As described above, according to the printing apparatus of the third embodiment, a target region more suited to the transparent processing computation can be derived.

Fourth Embodiment

The first embodiment has described the method in which the transparent processing is applied to all coordinates of a region as a target of the transparent processing computation in advance, and the clipping processing is executed. However, when the number of records is small, such processes require a longer time. That is, the processing time for coordinates which originally need not undergo the transparent processing computation becomes relatively longer.

In the fourth embodiment, the variable print processing suited to the case of a small number of records will be described.

Figure 14:
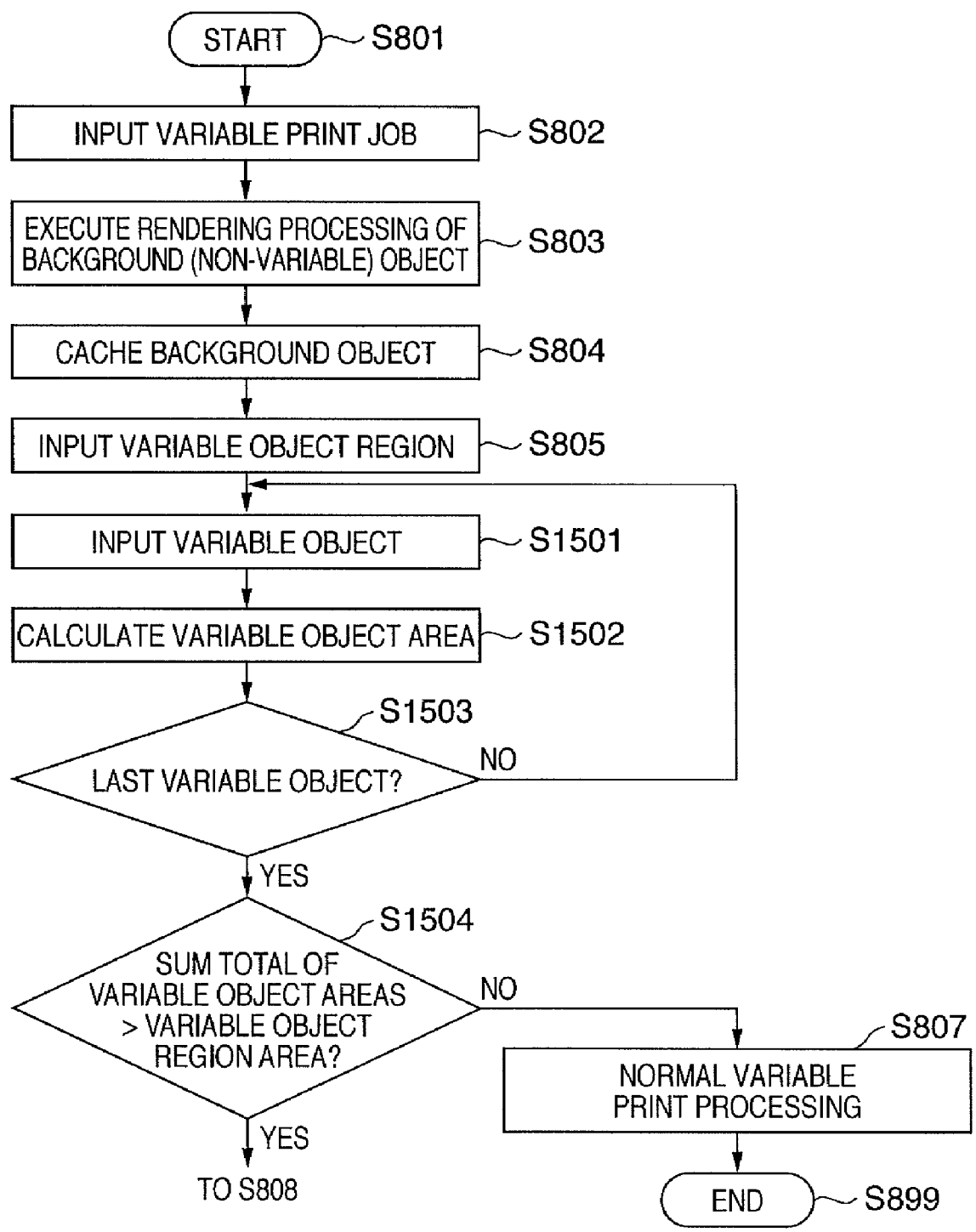
FIG. 14 is a flowchart showing the processing of a variable print job according to the fourth embodiment.

FIG. 14 is a flowchart showing the processing of a variable print job according to the fourth embodiment. More specifically, the CPU 602 switches to the normal processing shown in FIG. 5 according to a predetermined condition between steps S804 and S805 described with reference to FIG. 7. Note that respective steps of the following operation are implemented when the CPU 602 executes a control program.

In step S1501, the CPU 602 accepts an input variable object.

In step S1502, the CPU 602 derives an area (the number of pixels) of a region of the variable object input in step S1501. The CPU 602 derives the sum with the area saved in the RAM 606, and updates the value saved in the RAM 606. Note that an initial value saved in the RAM 606 in the first processing is "0".

The CPU 602 checks in step S1503 if the variable object as the current object to be processed is the last object. If the current variable object is not the last object, the process returns to step S1501. In this way, the CPU 602 can calculate the total area (the total number of pixels) of the regions of all variable objects. That is, the CPU 602 corresponds to a total pixel number derivation unit which derives the sum total of the numbers of pixels for all of a plurality of variable objects.

The CPU 602 checks in step S1504 if the derived total area (the total number of pixels) is larger than the area (the number of pixels) of the variable object region 701 input in step S805. If the CPU 602 determines that the total area is larger than that of the variable object region 701, the process advances to step S808; otherwise, the process advances to step S807. That is, since the area (the number of pixels) is approximately proportional to a time required for the transparent processing computation, the CPU 602 compares the areas, and selects the processing for a smaller area (total area).

Note that the CPU 602 may check in step S1504 if the number of records is smaller than a predetermined threshold. In this case, if the number of records is larger than the predetermined threshold, the process advances to step S808; otherwise, the process advances to step S807.

As described above, according to the printing apparatus of the fourth embodiment, the variable print processing can be executed at higher speed.

Other Embodiments

The preferred embodiments of the present invention have been explained, and the present invention may be applied to either a system constituted by a plurality of devices, or an apparatus consisting of a single device.

Note that the present invention can also be achieved by directly or remotely supplying a program that implements the functions of the aforementioned embodiments to a system or apparatus, and reading out and executing the supplied program code by that system or apparatus. Therefore, the technical scope of the present invention also includes the program code itself to be installed in a computer so as to make computer implement the functional processing of the present invention.

In this case, the form of program is not particularly limited, and an object code, a program to be executed by an interpreter, script data to be supplied to an OS, and the like may be used as long as they have the program function.

As a recording medium for supplying the program, for example, a floppy® disk, hard disk, optical disk (CD, DVD), magneto-optical disk, magnetic tape, nonvolatile memory card, ROM, and the like may be used.

As another program supply method, the program can be supplied when the user establishes a connection to a home page on the Internet using a browser of a client computer and downloads, from the home page, the computer program itself according to the present invention or a compressed file that includes an automatic installation function to a recording medium such as a hard disk or the like. Also, the program code that forms the program of the present invention may be segmented into a plurality of files, which may be downloaded from different home pages. That is, the scope of the present invention includes a WWW server which makes a plurality of users download a program required to implement the functional processes of the present invention by the computer.

Furthermore, a storage medium such as a CD-ROM or the like, which stores the encrypted program of the present invention, may be delivered to the users. The user who has cleared a predetermined condition may be allowed to download key information that decrypts the program from a home page via the Internet, and the encrypted program may be executed using that key information to be installed on a computer, thus implementing the present invention.

The functions of the aforementioned embodiments can be implemented when the computer executes the readout program. In addition, an OS, which runs on the computer, executes some or all of actual processes based on an instruction of the program, thereby implementing the functions of the aforementioned embodiments.

Furthermore, the program read out from the recording medium is written in a memory of an expansion board or a function expansion unit, which is inserted into or connected to the computer. After that, a CPU or the like equipped on that function expansion board or unit executes some or all of actual processes, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-160684, filed Jun. 18, 2007, which is hereby incorporated by reference herein in its entirety.

What is claimed is:

1. An image processing apparatus comprising:
    an input unit adapted to input a rendering job which includes a single fixed object common to respective pages, and a plurality of variable objects which are allocated in front of the fixed object and are independent for respective pages;
    a designation unit adapted to designate an inclusion region that includes rendering regions respectively for the plurality of rendering objects;
    a transparent processing unit adapted to generate transparent processed images corresponding to a plurality of transparency attributes by executing transparent processing in correspondence with the plurality of transparency attributes for a region of the fixed object that overlaps the inclusion region;
    for each page included in the rendering job,
    a clipping image generation unit adapted to generate a clipping image by clipping a region corresponding to a shape of the variable object from the transparent processed image corresponding to the same transparency attribute as the transparency attribute designated for the variable object; and a generation unit adapted to generate rendering data by blending the clipping image and the fixed object.

2. The apparatus according to claim 1, wherein a rectangular region including all rendering regions of the plurality of variable objects is designated as the inclusion region.

3. The apparatus according to claim 1, wherein a region derived by calculating a logical sum of rendering regions of the plurality of variable objects is designated as the inclusion region.

4. The apparatus according to claim 1, further comprising:

a derivation unit adapted to derive the sum total of the numbers of pixels for all of the plurality of variable objects by deriving the numbers of pixels of the plurality of variable objects; and a control unit adapted to execute said transparent processing unit when the sum total of the numbers of pixels derived by said derivation unit is larger than the number of pixels of the inclusion region designated by said designation unit.

5. A method of controlling an image processing apparatus, comprising:

an input step of inputting a rendering job which includes a single fixed object common to respective pages, and a plurality of variable objects which are allocated in front of the fixed object and are independent for respective pages;

a designation step of designating an inclusion region that includes rendering regions respectively for the plurality of rendering objects;

a transparent processing step of generating transparent processed images corresponding to a plurality of transparency attributes by executing transparent processing in correspondence with the plurality of transparency attributes for a region of the fixed object that overlaps the inclusion region;

for each page included in the rendering job, a clipping image generation step of generating a clipping image by clipping a region corresponding to a shape of the variable object from the transparent processed image corresponding to the same transparency attribute as the transparency attribute designated for the variable object; and a generation step of generating rendering data by blending the clipping image and the fixed object.

6. The method according to claim 5, wherein a rectangular region including all rendering regions of the plurality of variable objects is designated as the inclusion region.

7. The method according to claim 5, wherein a region derived by calculating a logical sum of rendering regions of the plurality of variable objects is designated as the inclusion region.

8. The method according to claim 5, further comprising:

a derivation step of deriving the sum total of the numbers of pixels for all of the plurality of variable objects by deriving the numbers of pixels of the plurality of variable objects; and a control step of executing the transparent processing step when the sum total of the numbers of pixels derived in the derivation step is larger than the number of pixels of the inclusion region designated in the designation step.

9. An image processing apparatus comprising:

an input unit adapted to input a rendering job which includes a single fixed object common to respective pages, and a plurality of variable objects which are allocated in front of the fixed object and are independent for respective pages;

a designation unit adapted to designate an inclusion region that includes rendering regions respectively for the plurality of rendering objects;

a storage control unit adapted to execute transparent processing to the fixed object and the inclusion region for a region of the fixed object that overlaps the inclusion region, and to store a generated transparent processed image in a storage unit;

for each page included in the rendering job, a clipping image generation unit adapted to generate a clipping image by clipping a region corresponding to a shape of the variable object from the image which is stored in the storage unit and has undergone the transparent processing; and a generation unit adapted to generate rendering data by blending the clipping image and the fixed object.

10. The apparatus according to claim 9, wherein a rectangular region including all rendering regions of the plurality of variable objects is designated as the inclusion region.

11. The apparatus according to claim 9, wherein a region derived by calculating a logical sum of rendering regions of the plurality of variable objects is designated as the inclusion region.

12. The apparatus according to claim 9, further comprising:

a derivation unit adapted to derive the sum total of the numbers of pixels for all of the plurality of variable objects by deriving the numbers of pixels of the plurality of variable objects; and a control unit adapted to execute said storage control unit when the sum total of the numbers of pixels derived by said derivation unit is larger than the number of pixels of the inclusion region designated by said designation unit.

13. A method of controlling an image processing apparatus, comprising:

an input step of inputting a rendering job which includes a single fixed object common to respective pages, and a plurality of variable objects which are allocated in front of the fixed object and are independent for respective pages;

a designation step of designating an inclusion region that includes rendering regions respectively for the plurality of rendering objects;

a storage control step of executing transparent processing to the fixed object and the inclusion region for a region of the fixed object that overlaps the inclusion region, and storing a generated transparent processed image in a storage unit;

for each page included in the rendering job, a clipping image generation step of generating a clipping image by clipping a region corresponding to a shape of the variable object from the image which is stored in the storage unit and has undergone the transparent processing; and a generation step of generating rendering data by blending the clipping image and the fixed object.

14. A program stored in a computer-readable recording medium to make a computer execute a control method of an image processing apparatus according to claim 5.

* * * * *